US006892189B2

(12) United States Patent
Quass et al.

(10) Patent No.: US 6,892,189 B2
(45) Date of Patent: May 10, 2005

(54) METHOD FOR LEARNING AND COMBINING GLOBAL AND LOCAL REGULARITIES FOR INFORMATION EXTRACTION AND CLASSIFICATION

(75) Inventors: Dallan W. Quass, Elk Ridge, UT (US); Tom M. Mitchell, Pittsburgh, PA (US); Andrew K. McCallum, Pittsburgh, PA (US); William Cohen, Pittsburgh, PA (US)

(73) Assignee: Inxight Software, Inc., Sunnyvale, CA (US)

( * ) Notice: Subject to any disclaimer, the term of this patent is extended or adjusted under 35 U.S.C. 154(b) by 590 days.

(21) Appl. No.: 09/771,008

(22) Filed: Jan. 26, 2001

(65) Prior Publication Data

US 2002/0103775 A1 Aug. 1, 2002

(51) Int. Cl.[7] .............................. G06F 15/18; G06F 7/00
(52) U.S. Cl. .............................................. 706/12; 701/1
(58) Field of Search ................................ 706/15–60, 12; 707/1–6

(56) References Cited

U.S. PATENT DOCUMENTS

| | | | | |
|---|---|---|---|---|
| 5,809,493 | A | * | 9/1998 | Ahamed et al. ............... 706/52 |
| 5,930,803 | A | | 7/1999 | Becker et al. |
| 5,963,940 | A | * | 10/1999 | Liddy et al. .................... 707/5 |
| 6,026,388 | A | * | 2/2000 | Liddy et al. .................... 707/1 |
| 6,161,130 | A | | 12/2000 | Horvitz et al. |
| 6,233,575 | B1 | | 5/2001 | Agrawal et al. |
| 6,304,864 | B1 | * | 10/2001 | Liddy et al. ................... 706/15 |
| 6,389,436 | B1 | * | 5/2002 | Chakrabarti et al. ........ 715/513 |
| 6,516,308 | B1 | * | 2/2003 | Cohen ........................... 706/12 |
| 6,571,225 | B1 | * | 5/2003 | Oles et al. ..................... 706/12 |

OTHER PUBLICATIONS

Recognizing Structures in Web Pages Using Similarity Queries, William W. Cohen, (1999) American Association for Artificial Intelligence.*

Learning Page–Independent Heuristics for Extracting Data From Web Pages, Cohen W. W., and Fan, W. (1999) Proceeding of the 1998 American Association for Artificial Intelligence Spring Symposium on Intelligent Agents in Cyberspace.*

Fast Effective Rule Induction In Machine Learning, Cohen W. W. (1995) Proceedings of the Twelth International Conference, Lake Tahoe, California, Moran Kaufmann.*

(Continued)

Primary Examiner—Anthony Knight
Assistant Examiner—Michael B. Holmes
(74) Attorney, Agent, or Firm—Townsend and Townsend and Crew LLP; Kenneth R. Allen (57) ABSTRACT

A method is provided for information extraction and classification which combines aspects of local regularities formulation with global regularities formulation. A candidate subset is identified. Then tentative labels are created so they can be associated with elements in the subset that have the global regularities, and the initial tentative labels are attached onto the identified elements of the candidate subset. The attached tentative labels are employed to formulate or "learn" initial local regularities. Further tentative labels are created so they can be associated with elements in the subset that have a combination of global and local regularities, and the further tentative labels are attached onto the identified elements of the candidate subset. Each new dataset is processed with reference to an increasingly-refined set of global regularities, and the output data with their associated confidence labels can be readily evaluated as to import and relevance.

15 Claims, 4 Drawing Sheets

OTHER PUBLICATIONS

Integration of Heterogeneous Databases Without Common Domains Using Queries Based On Textual Similarity, Cohen W. W., (1998) Proceedings of ACM SIGMOD-98.*

A Web-based Information System That Reasons With Structured Collections of Text, Cohen W. W., (1998) Proceedings of Autonomous Agents-98.*

A Robust System Architectrure for Mining Semi-structured Data, Lisa Singh, Bin Chen, Rebecca Haight, Peter Scheuermann, Kiyoto Aoki (1998) American Association for Artificial Intelligence, NEC Research Institute ( CITESEER ).*

Generating Association Rules from Semi-Structured Documents Using an Extended Concept Hierarchy, Lisa Sign Peter Scheuermann, Bin Chen, (1997) NEC Research Institute ( CITESEER ) pp. 1–8.*

Towards Heterogeneous Multimedia Information Systems: The Garlic Approach, Carey et al., IEEE, (1995) Research Issues in Data Engineering, Distributed Object Management, Proceeding RIDE-DOM Fifth International Workshop, pps. 124–131.*

Type Classification of Semi-Structured Documents, Markus Tresch, Neal Palmer, Allen Luniewski, Proceeding of the $21^{st}$ VLDB Conference, Zurich, Switzerland, (1995) pp. 263–274.*

Knowledge Discovery Using KNOW-IT (KNOWledge Base Information Tools); Elizabeth D. Liddy (1998) IEEE, pps. 67–70.*

FeaFeature Selection in Text Categorization Usin the Baldwin Effect; Edmund S. Yu & Elizabeth D. Liddy; (1999), IEEE, pps. 2924–2927.*

NLP-Supported Decision-Making, Elizabeth D. Liddy, (1999) IEEE, pps. 390–391.*

A Classification of Multi-Database Languages, Markus Tresch; Mark H. Scholl; (1994) IEEE, Parallel and DEstributed Information Systems, Proceeding of the Third International Conference, pps. 195–202.*

Agichitien et al. "Snowball: Extracting Relations from Large Plain-Text Collections," Proceedings of the fifth ACM conference on Digital libraries, pp. 85–94 (2000).

Brin "Extracting Patterns and Relations from the World Wide Web," The Proceedings of the 1998 International Workshop on the Web and Databases, pp. 172–183 (1998).

Chen et al. "Data Mining: An Overview from a Database Perspective," IEEE Transactions on Knowledge and Data Engineering 8:866–883 (1996).

Cohen "Recognizing Structure in Web Pages using Similarity Queries," Proceedings of the sixteenth national conference on Artificial Intelligence and eleventh innovation applications of AI conference on artificial intelligence and innovative applications of artificial intelligence, pp. 59–66 (1999).

Collins et al. "Unsupervised Models for Named Entity Classification," Proceedings of the Joint SIGDAT Conference on Empirical Methods in Natural Language Processing and Very Large Corpora, pp. 169–196 (1999).

Cooley et al. "Grouping Web Page References into Transactions for Mining World Wide Web Browsing Patterns," Proceedings of the 1997 IEEE Knowledge and Data Engineering Exchange Workshop (KDEX '97), pp. 2–9 (1997).

Garofalakis et al "Data Mining and the Web: Past, Present and Future," Proceedings of the ACM CIKM'99 2nd Workshop on Web Information and Data Management (WIDM'99), pp 43–47 (1999).

Kawano "Mondou: Web search engine with textual data mining," Proceedings of the IEEE Pacific Rim Conference of Communications, Computers and Signal Processing, pp. 402–405 (1997).

Lin et al. "Extracting Classification Knowledge of Internet Documents with Mining Term Associations: A Semantic Approach," Proceedings of the 21st annual international ACM SIGIR conference on Research and development in information retrieval, pp. 241–249 (1998).

Nigam et al. "Learning to Classify Text from Labeled and Unlabeled Documents," The Proceedings of the Fifteenth National Conference on Artificial Intelligence, pp. 792–799 (1998).

Riloff et al. "Learning Dictionaries for Information Extraction by Multi-level Bootstrapping," Proceedings of the sixteenth national conference on artificial intelligence and eleventh innovation applications of AI conference on Artificial intelligence and innovative applications of artificial Intelligence, pp. 474–479 (1999).

* cited by examiner

FIG. 3
(PRIORT ART)

METHOD FOR LEARNING AND COMBINING GLOBAL AND LOCAL REGULARITIES FOR INFORMATION EXTRACTION AND CLASSIFICATION

BACKGROUND OF THE INVENTION

This invention relates to information extraction from a plurality of disparate information sources. More specifically this invention relates to automatic identification of field types and classification of record types in a source of electronically-readable textual information. A specific application is in the field of data mining of web pages accessible via the World Wide Web. Another specific application is data mining of electronic mail records, plain text documents or structured databases.

There is a need for a database with information which has been ordered where the source of information is not organized in a form which is directly translatable. Unlike database conversion engines, which can perform field to field translation, there is a need to extract and organize information found in text.

Heretofore, text information extraction engines have been able to extract information according to a standardized pattern from multiple sources (global extraction), or to extract information based on learned or manually developed regularities specific to a subdomain (local extraction).

Parameter estimation is used for pattern recognition. However, parameter estimation is often difficult due to lack of sufficient labeled training data, especially where numerous parameters must be learned, as is the case when learning statistical language models, document classifiers, information extractors, and other regularities used for data mining of text data.

Machine learning generally assumes that all training data and test data come from a common distribution. However, certain subsets of the data may share regularities with each other but not with the rest of the data. For example, consider product names on corporate web sites from all over the web. The product names on a particular web site may share similar formatting but have formatting differing significantly from product names on other companies' web sites. Other examples include annotations for patients from a particular hospital, voice sounds from a particular speaker, and vibration data associated with a particular airplane. These subsets are called localities.

Taking advantage of local regularities can help a learning method deal with limited labeled training data because the local regularities are often simpler patterns and can be described using fewer parameters.

Expectation maximization is a known technique for providing data with confidence labels. An example is reported by K. Nigam, A. McCallum, S. Thrun, and T. Mitchell, in "Learning to Classify Text from Labeled and Unlabeled Documents" published in *The Proceedings of the Fifteenth National Conference on Artificial Intelligence*, (AAAI Press, 1998).

Work in this field has been reported by Sergey Brin entitled *Extracting Patterns and Relations from the World Wide Web* published in *The Proceedings of the* 1998 *International Workshop on the Web and Databases*, March 1998. Application was for extraction of authorship information of books as found in descriptions of the books on web pages. This work introduced the process of dual iterative pattern-relation extraction wherein a relation and pattern set is iteratively constructed. Among other limitations, the Brin approach employed a lexicon as a source of global regularities, and there is no disclosure or suggestion of formulating or "learning" site specific ("local") patterns or even of an iterative procedure for refining site and page specific (local) patterns.

Agichitien and Gravano in "Snowball: Extracting Relations from Large Plain-Text Collections" dated Nov. 29, 1999, Riloff and Jones, "Learning Dictionaries for Information Extraction by Multi-level Bootstrapping," *Proceedings of the Sixteenth National Conference on Artificial Intelligence*," (1999), and Collins and Singer, "Unsupervised Models for Named Entity Classification," represent other lexicon generators of the same general form as Brin.

Work by William W. Cohen of AT&T Research Labs entitled "Recognizing Structure in Web Pages using Similarity Queries," *Proceedings of the National Conference on Artificial Intelligence* (AAAI ) (July 1999) http://www.aaai.org, also uses lexical-based approximate matching.

Other classification methods are known in the art and are briefly characterized here. The first is transduction. Transduction allows the parameters of a global classifier to be modified by data coming from a dataset that is to be classified, but it does not allow an entirely different classifier to be created for this dataset. In other words, a single classifier must be used, applying to the entire set of data to be classified, and the algorithm is given no freedom to select subsets of the data over which to define local regularities.

Another classification-related method is co-training. In co-training, the key idea is to learn two classifiers which utilize two independent and sufficient views of an instance. Although co-training does learn two distinct classifiers, both of these apply to the global dataset. Here again, the algorithm does not learn local classifiers, and it has no freedom to select subsets of data over which stronger classifiers might be learned.

Lexical-based approximate matching has been observed to lack sufficient matching accuracy and context sensitivity to be useful to formulate local regularities with accuracy as great as a desired level. Moreover, there has been no recognition of the significance of the differences in the scope of regularities or of the different types of regularities that can be learned based on the scope of regularities. For example, regularities that hold within a website do not necessarily hold across the entire World Wide Web. There is a need for a reliable mechanism for formulating site specific regularities using only a rational amount of training effort and resources.

SUMMARY OF THE INVENTION

According to the invention, in a data processing system, a method is provided for formulating and combining global regularities and local regularities for information extraction and classification which combines aspects of local regularities formulation with global regularities formulation. Global regularities are patterns which are valid over an entire dataset, such as all pages on the World Wide Web which are relevant to a particular domain of discourse, and local regularities are patterns which are valid primarily over some subset of the data, such as over a confined set of pages associated with a single web site. According to the invention, descriptions of global regularities are initially provided to a working database, then a candidate subset such as the web pages of a single site of the dataset is identified as likely to be a subset in which local regularities are found.

Then tentative labels which have values useful for tagging like information are created so they can be associated with elements in the subset that have the global regularities, and the initial tentative labels are attached onto the identified elements of the candidate subset. The attached tentative labels are employed via one of a class of inductive operations to formulate or "learn" initial local regularities. Further, tentative labels are created so they can be associated with elements in the subset that have a combination of global and local regularities, and the further tentative labels are attached onto the identified elements of the candidate subset. The steps can be repeated iteratively to obtain further iterations of attached tentative labels, each time testing if the estimated error rate is within a preselected tolerance or if a steady state in the further tentative labels is evident; and if true then the confidence of the attached further tentative labels is rated and if a preselected confidence level is achieved, some of the attached further tentative labels are converted to "confidence labels." This process is applied to the same dataset and to other datasets until no further information of interest is obtained. A second refining iterative operation uses the operation to formulate a revised set of global regularities. Global regularities are revised based on the confidence labels assigned for all processed datasets. Thus, each new dataset is processed with reference to an increasingly-refined set of global regularities, and the output data with their associated confidence labels can be readily evaluated as to import and relevance.

This new method for classifying and extracting data from a general set of data, hereafter called Global Data, takes advantage of local regularities that may exist in subsets of the Global Data that share easily-identifiable common characteristics, such as the set of web pages that reside on the same Internet domain. Such an easily-identifiable subset of the Global Data that contains such local regularities may hereafter be called a Local Dataset. Such local regularities may do an excellent job of labeling the data in the Local Dataset for the purpose of classification or information extraction, even though the regularities do not appear in a random sample of the entire Global Dataset. For example, given the general task of classifying whether web pages contain job openings, a particular web site may include the word "Careers" in the title of all of their pages with job openings, but the word "Careers" might appear only rarely in the titles of pages with job openings from a random sample of pages from many different web sites.

The invention will be better understood by reference to the following detailed description in connection with the accompanying drawings.

DESCRIPTION OF SPECIFIC EMBODIMENTS

By way of further background it is helpful to examine techniques which may be considered prior art. The presentation herein is the inventors' interpretation of the work of others and does not necessarily represent the interpretation applied by the authors of those techniques.

Figure 1:
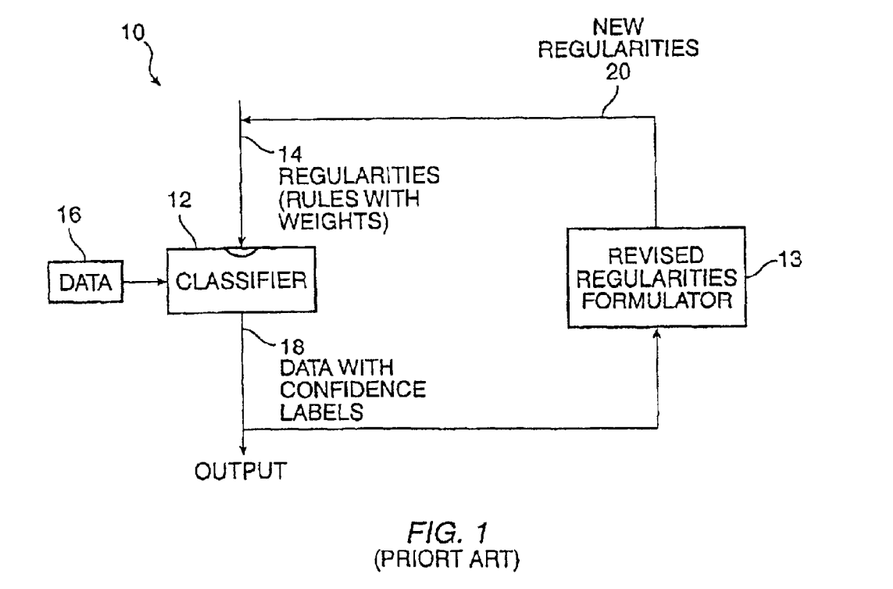
FIG. 1 is a block diagram of a system for basic expectation maximization according to the prior art.

Referring to FIG. 1, there is a block diagram of a prior art technique for confidence labeling of a dataset. By a confidence label, it is meant a label accompanied by a value indicating a level of reliability or confidence in the labeling of the associated data. A dataset of interest is for example a plurality of websites of the world wide web, all of which might relate to a certain subject, such as employment opportunities. Each website contains a plurality of pages. A working database is associated with a search engine. The illustration is based on the well known expectation maximization algorithm. A system 10 comprises a classifier 12 and a revised regularities formulator 13. The classifier 12 receives regularities 14 (for example, rules with weights) as patterns to look for in data 16. Its output is data with confidence labels 18. These data with confidence labels 18 are supplied to the revised regularities formulator 13, which formulates new regularities 20 to be used in connection with the other regularities in feedback to the classifier. The new regularities 20 may replace the original regularities 14. This is a standard technique attempting to iteratively improve the accuracy of the regularities and the labeling. An example of this is provided by Nigam et al., in which the approach is used to formulate a Bayesian classifier of text documents by iteratively applying the classifier to label the dataset with tentative labels, then using the tentative labels to retrain the classifier.

Figure 2:
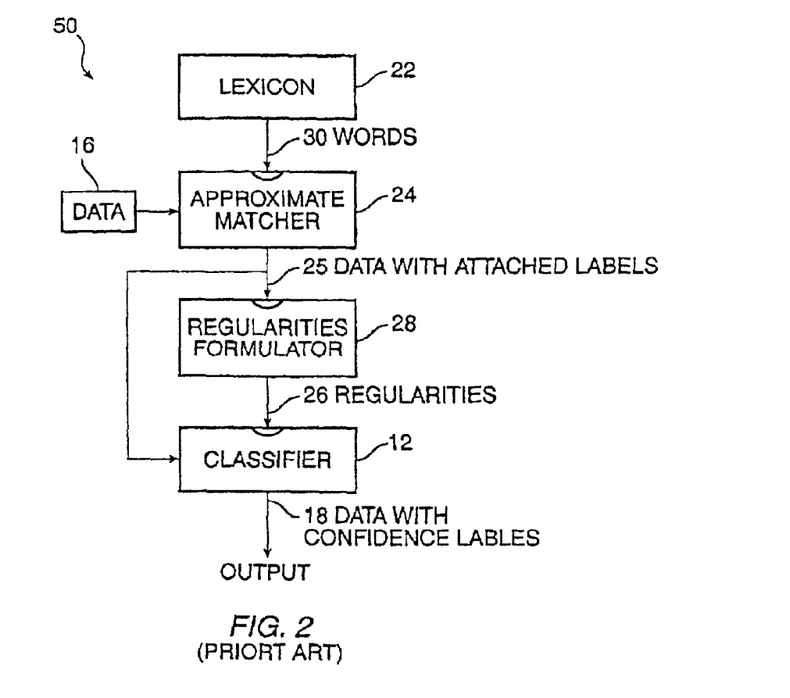
FIG. 2 is a block diagram of a regularity formulator initialized by a lexicon according to the inventors' interpretation of Cohen as if it were the prior art.

FIG. 2 is a block diagram of a simplified structure 50 for illustrating the process of formulating regularities using a lexicon 22 to provide as output data with confidence labels 18. This is the inventors' interpretation of the work of Cohen at AT&T Labs. A lexicon 22 of words is used in an approximate matcher 24 to provide tentative labels to elements of data 25 for use in formulating regularities 26 via a regularities formulator 28. The regularities 26 are provided, along with the data with tentative attached labels 25 to a classifier 12, which then provides as output data with confidence labels 18. There is no suggestion of feedback.

Figure 3:
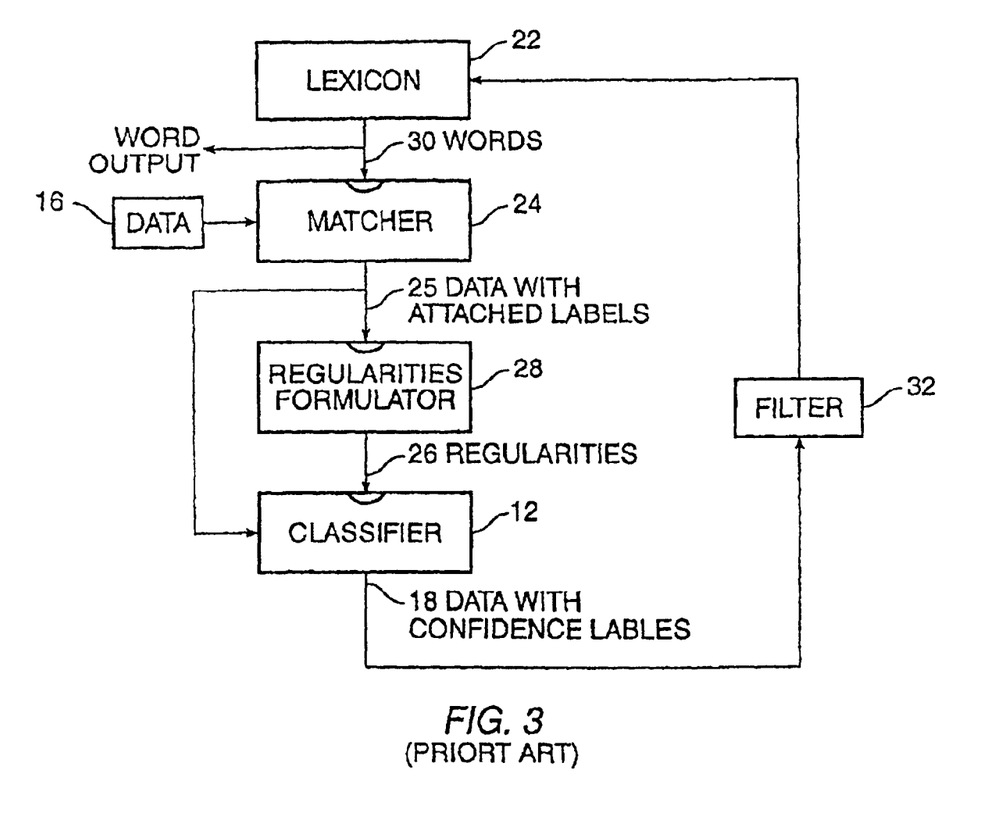
FIG. 3 is a block diagram of a lexicon builder according to the inventors' interpretation of Riloff and Jones as if it were prior art.

FIG. 3 is a block diagram of a structure for illustrating bootstrapping of a lexicon, as taught for example in Riloff and Jones as well as elsewhere. The Riloff and Jones output is the words 30 of the lexicon 22. Feedback is provided in the form of some or all of the data with confidence labels 18, supplied through a filter 32 to the lexicon 22. In contrast to bootstrapping, the goal in the present inventive approach is to label the correct data rather than to output a lexicon. It is therefore possible under the present approach for a particular data element to be labeled by the Global Classifier but then to be unlabeled by the combination of Global and Local Classifiers. It is also possible for the data to be unlabeled by later iterations of the loops. Since the purpose of bootstrapping is to build a lexicon that is as complete as possible, the "global classifier" used in bootstrapping is restricted to a simple list of lexicon terms. Each iteration of the lexicon simply adds terms to the global lexicon. Data elements are never unlabeled because they do not obey local regularities. Another distinction between bootstrapping and the present invention is that bootstrapping does not involve the deliberate formulation of two distinct sets of complex regularities (e.g., rules or other patterns), one of which applies globally, and one of which applies locally.

Figure 4:
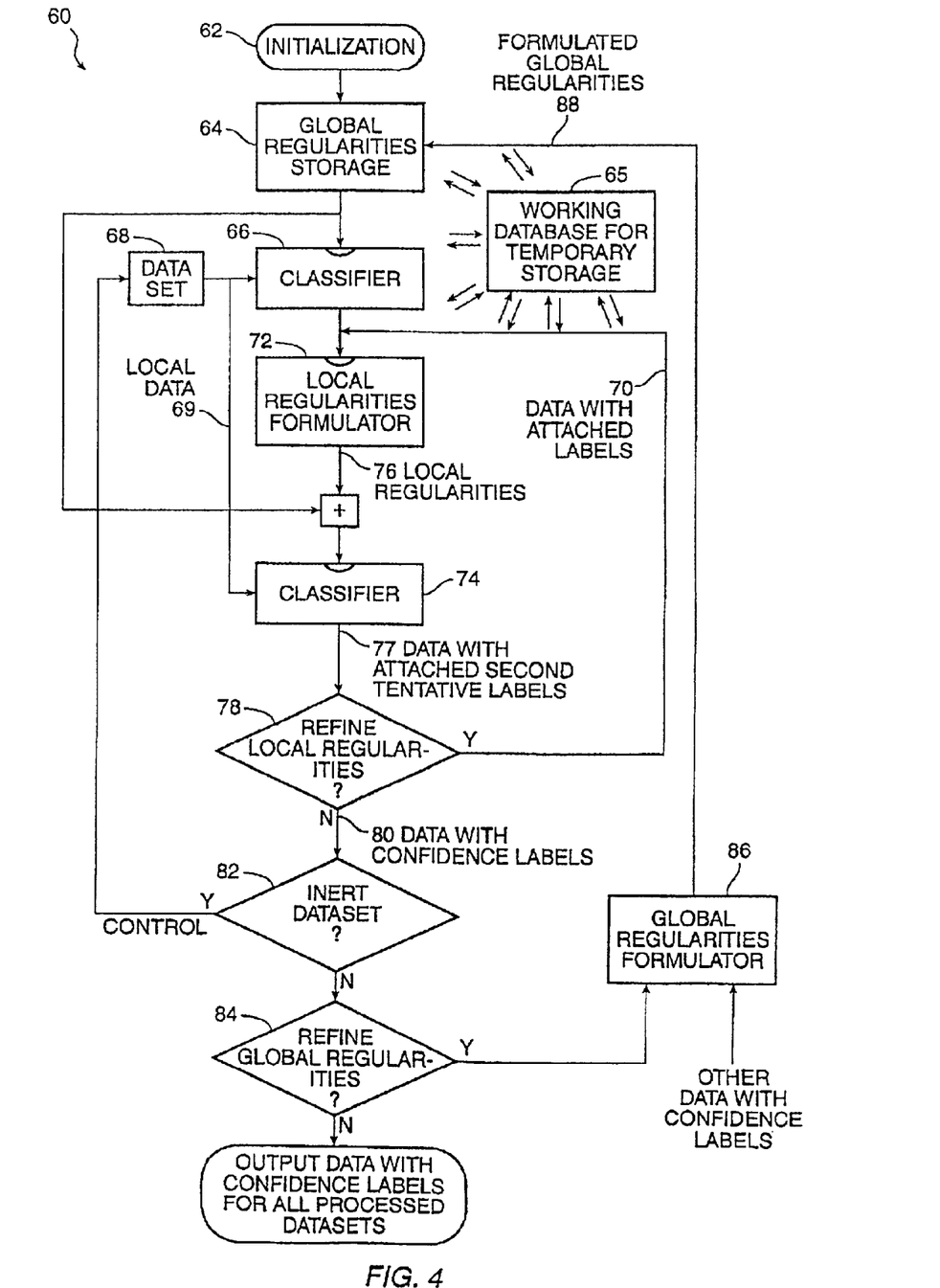
FIG. 4 is a block diagram of an information extractor operative according to the invention.

FIG. 4 is a block diagram of a mechanism 60 for performing the process according to the invention. This mechanism 60 can assume a number of forms, but it is most useful in a high speed data processing system as part of an information extraction system. It can be used for organizing information found in the text of websites, documents, electronic messages, and other libraries of information.

The invention employs two different sets of regularities, one formulated over a global dataset and one formulated over a local dataset which is a subset of the global dataset. Initial global regularities may be formulated manually or inductively derived from prior hand-labeled data. The local regularities are formulated using an initial labeling derived from the global regularities. The local regularities can be refined using a feedback mechanism. The global regularities also can be refined using a feedback mechanism. This is all illustrated in the diagram of FIG. 4.

The process is as follows:

With initialization 62 descriptions of global regularities 64 are initially input from a source in which descriptions are formulated manually or are inductively derived from prior labeled data, and which are much more than lexical information in that it may include words, context, or arbitrary features that may be combined and/or weighted. The global regularities cover examples beyond any examples used for formulation. The global regularities are initially stored for processing in a working database 65. It is to be noted that the global regularities are in general patterns which are found in an entire dataset.

Thereafter a first classifier 66 is provided with a local data subset (path 69) of the dataset 68. This local subset of the dataset is expected to contain local regularities. The global regularities 64 are used to tentatively identify elements in the subset of the dataset to generate "first tentative labels" for the data. The first tentative labels are useful for tagging like information. The first tentative labels are attached to local data 69, resulting in data elements with attached labels 70 so identified and supplied to a local regularities formulator 72.

The attached first tentative labels are used in the local regularities formulator 72 in one of a class of inductive operations to formulate (first) local regularities 76. The class of inductive operations include rule learning methods, decision tree learning methods, Bayesian learning methods, artificial neural networks, or any other method for function approximation from labeled examples. Thereafter, using the (first) local regularities 76 and the global regularities 64, the second classifier 74 processes the local data 69 to tentatively identify elements having specific combinations of the global regularities and the local regularities to obtain attached second tentative labels 77. A decision element 78 then performs a series of tests. It tests if an estimated error rate is within a preselected tolerance or if a steady state in the attached second tentative labels 77 is evident. If true, confidence of the attached second tentative labels is rated. The attached second tentative labels 77 are converted to "confidence labels" associated with the data 80. The selection is typically based upon achievement of a preselected confidence level and not necessarily on sensing of a steady state. Output is of the data 80 with the confidence labels.

The process is iterative. If the condition is not true (element 78), the data with attached second tentative labels 77 is fed back as data with attached labels 70 to the local regularities formulator 72. The local regularities formulator 72 uses the second tentative labels via the operation on the candidate subset to formulate second local regularities, and the second classifier 74 tentatively identifies elements having specific combinations of the global regularities and the local regularities to obtain "attached second tentative labels" which can then be tested as before by element 78 until the conditions are met for termination or continued refined processing is invoked.

Other subsets of the global dataset may then be investigated to learn other local regularities. If this process is selected (via element 82), the process is invoked with the first classifier 66 on the newly selected local data 69 subset of the dataset 68.

The global regularities can be further refined in accordance with the invention. If this process is selected (via element 84), the data with confidence labels 80 and any other data with confidence labels from earlier processing or earlier data are supplied to a global regularities formulator 86 to learn new global regularities 88. The global regularities formulater 86 may be based on the same engine as used in the local regularities formulator 72 or another appropriate engine may be used. Examples are a Bayesian learner or a rule learning algorithm. The formulated global regularities are then used according to the process of the invention beginning with the invocation of the first classifier 66 to further refine the characterization of the data. Since the newly formulated global regularities may improve upon the original formulations, it may prove fruitful to reprocess subsets of the global dataset to extract data with even better confidence levels.

The final output is data with confidence labels for all processed datasets. Examples include compilations of employment opportunities reported in any form on the World Wide Web parsed according to location, specialty, job title, contact address, company name, experience level and salary range. Another example is a conference schedule derived from a review of electronic mail exchanges among numerous potential conference participants. Parsing may be about time, place, duration, nature of meeting, and type of report. As can be seen there is a variety of applications to data organization of material extracted from various sources which is presented in relatively unstructured form.

Figure 5:
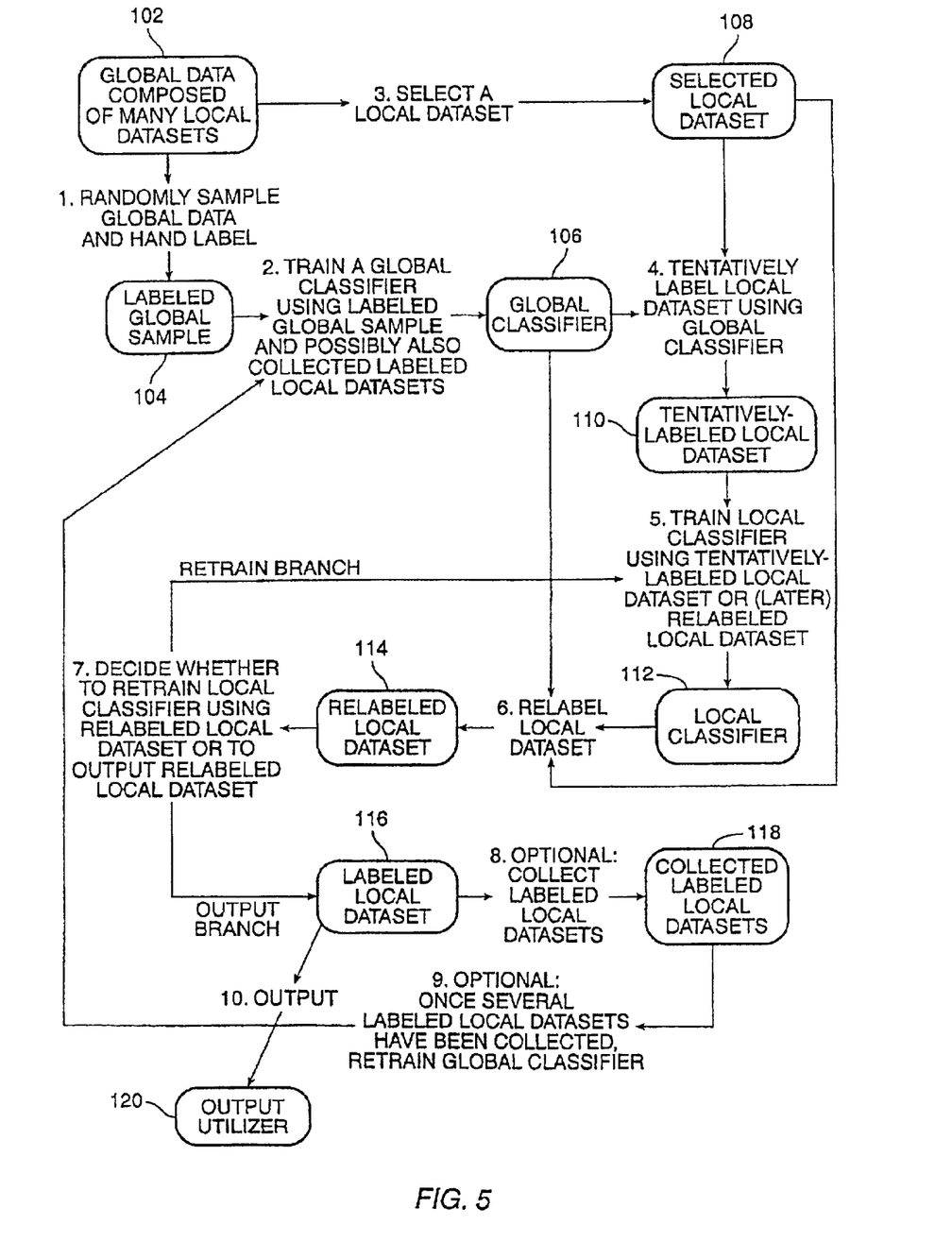
FIG. 5 is a state diagram showing steps in training a classifier in accordance with the invention.

FIG. 5 illustrates training of a Global Classifier using a randomly-selected subset of Global Data which has previously been hand labeled. This is the precursor to learning local regularities. The Global Data 102 is composed of many Local Datasets. First, the Global Data is randomly sampled and hand labeled (Step 1) to form a Labeled Global Sample 104. Next, a Global Classifier 106 is trained (as it were, created) using the Labeled Global Sample 104 (Step 2). If available from previous trainings, this training may also employ Collected Labeled Local Datasets 118. The Global Classifier 106 is for finding "global regularities"—those that apply to the entire Global Dataset, but which may not be as good at labeling the data in a particular Local Dataset as the local regularities that exist in that dataset, as will be shown. (In addition to training the global classifier using hand-labeled data, other methods for training/deriving a Global Classifier, such as use of hand-coded rules or automatic methods, may also be used but are not explicitly depicted in the figure.)

It is then possible to label a Local Dataset 104 selected from the Global Data 102. First, the Local Dataset is selected (Step 3) to yield a Selected Local Dataset 108. Then the Global Classifier 106 is used to provide an initial tentative labeling of the Local Dataset 110 (Step 4).

Next, the Tentatively-Labeled Local Dataset 110 is used as training data to train a second classifier, hereafter called a Local Classifier 112 (Step 5). Since the data used to train the Local Classifier 112 comes entirely from the Local Dataset, a Local Classifier 112 is able to find the local regularities—those that exist specifically in the Local Dataset.

This Local Classifier 112 can be entirely independent of the Global Classifier 106. It is free, for example, to use features different from those of the Global Classifier, and/or to use a training algorithm that prefers hypotheses of the type believed most likely to hold over the Local Dataset. The labels produced by the Global Classifier 106 are likely to be approximately correct, but are unlikely to be totally correct. This results in "noise" in the labeling provided to train the Local Classifier 112. Due to this noise, the local classifier needs to be of the form that it can learn simple hypotheses in the presence of noisy labeling. Furthermore, since the Local Classifier 112 will be used in the next step to relabel the same Local Dataset upon which it was trained, it needs to be resistant to overfitting.

Features that have proven especially useful in training a Local Classifier 112 to classify or extract data from web pages include the features XPaths or derivatives of XPaths. Often, pages of the same class from the same Internet domain contain text that is formatted similarly. Likewise, data elements to be extracted that are of the same type (same field) and appear on pages from the same Internet domain are often formatted similarly. The features XPaths and their derivatives capture the concept of similar formatting. Regularities described by XPaths and their derivatives are typically local regularities but not global regularities—while web sites may use formatting that is consistent within the domain, formatting is rarely consistent across domains.

After the Local Classifier 112 has been trained, the Local Classifier 112 alone or in combination with the Global Classifier 106 is used to relabel the Local Dataset on which the Local Classifier was trained (Step 6). The Local Classifier 112 makes its decisions based upon local regularities, and the Global Classifier 106 makes its decisions based upon global regularities. Any of a number of techniques may be used to combine the two classifiers, such as weighted voting or voting a posteriori.

Once the Local Dataset has been relabeled as a Relabeled Local Dataset 114, a decision must be made (Step 7). Either the Relabeled Local Dataset 114 can be output with the labels that have been assigned as the Labeled Local Dataset 116 to the Output Utilizer 120 (Step 10), yielding the desired answer, or it can be used to retrain the Local Classifier (looping back to Step 5).

The reason behind potentially looping back to retrain the Local Classifier is as follows: Assuming that the labels associated with the Relabeled Local Dataset 114 are more accurate than the tentative labels initially given by the Global Classifier (i.e., there is less "noise" in the Relabeled Local Dataset 114 than in the initial tentative labeling 110), then retraining the Local Classifier 112 from the Relabeled Local Dataset 114 may make the Local Classifier 112 more likely to find the correct local regularities. The retrained Local Classifier 112 can then be used again alone or in combination with the Global Classifier 106 to relabel the Local Dataset 108 once again (Step 6). This loop can be repeated as often as desired.

The decision of whether to loop back and retrain the Local Classifier 112 or to output the Relabeled Local Dataset 114 can be made in a variety of ways. For example, loop back may be performed a fixed number of times or until the current iteration results in the same labeling as a preceding iteration or until the estimated error is within a preselected tolerance.

As a an option following the primary processing, each Labeled Local Dataset 116 so output can be collected and saved (Step 8). Once several Labeled Local Datasets 118 have been collected, they may be used, possibly in combination with the original hand-labeled Global Sample 104, to retrain the Global Classifier 106 (Step 2). Assuming that the labels associated with the Labeled Local Datasets 118 are reasonably accurate, training the Global Classifier 106 on more data should make the Global Classifier 106 more likely to find the correct global regularities. With a retrained Global Classifier 106, Local Datasets can be relabeled (Step 6) using the Global Classifier 106 as just trained and the data run the back through the algorithm, causing relabeling and re-output in response to a database query requesting information from the database to an output utilizer 120 (Step 10). There are various alternatives and extensions to the inventive process.

In the above description only a single Global Classifier has been described by way of example. It is possible to train an ensemble of Global Classifiers, each having different characteristics governing the types of errors they make when labeling the data. Each of the Global Classifiers can be used to provide tentative labels for the Local Dataset (Step 4). The Local Classifier is trained (Step 5) using labels provided by each of the Global Classifiers. The algorithm used to train the Local Classifier can make use of knowledge of the various types of errors made by the various Global Classifiers to help compensate for the expected "noise" in the training data.

In the above description, it was assumed there were only two levels of regularities: global and local. In general, multiple levels of regularities are possible. For example, within a web site, there may be regularities that are local to a particular page or group of pages. In that case there are three levels of regularities: global regularities, regularities that apply to the entire site, and regularities that apply to a single page or group of pages. It is possible to extend the above-described technique to handle multiple levels of regularities in the following way: For each level of regularities in order, from the most global to the most specific: test for level and if this is the most global level, train the classifier as before. Otherwise, use the classifier(s) created for the higher (more global) levels of regularities to provide the tentative labeling of the dataset at this level. Relabel the dataset at this level using a combination of the classifier trained at this level and all of the higher-level classifiers. The Labeled Local Dataset that is output by the lowest-level classifier is the labeling to be returned in response to a database query.

The invention has been explained with reference to specific embodiments. Other embodiments will be apparent to those of ordinary skill in the art. For example, in view of the inherent uncertainty of accuracy of the formulators, it is understood that the invention does not preclude the possibility of human intervention in the classification processes to manually refine the confidence labels assigned by the classifiers to insert new labels or remove labels or change the label or weight of the label with respect to the data. Similarly, the output of the regularity formulators (local and global) to substitute rules. The invention has broad applications to the emerging field of data mining by using techniques to add value to data by developing and discovering relationships which might not otherwise be identifiable. A particular application is the searching of information embedded in web pages where the level granularity of the information is not uniform, where different terms are used for similar concepts and the same terms are used for different concepts. The invention allows effective searching and information extraction under such conditions.

Other possible uses are in various types of information extraction, classification, regression, anomaly detection, segmentation, density estimation, model selection, active learning and reinforcement learning. The invention can be combined with methods based on rote learners, neural networks, rule learners, Bayesian methods, k-nearest neighbor, and maximum entropy techniques to name a few. The techniques of the invention can also be applied where the source of the global information is provided manually and where human labelers are provided as a reality check in the operation of the feedback loop. While the process is expected to be iterative, the process of the invention also works with little or no iteration. The method can be implemented on a server and products incorporating the method can be distributed by any carrier medium, including CD-ROM, disk, or by telecommunication signaling methods from data storage and distribution sites accessible via telephone or via the Internet.

It is therefore not intended that the invention be limited except as indicated by the appended claims.

What is claimed is:

1. In a data processing system, a method for creating a database from information found on a plurality of web pages, said information comprising global regularities and local regularities, said global regularities being patterns that are expected to be found in all said web pages, and said local regularities being patterns which are not expected to be found in all said web pages, said method comprising:
   a) providing a global classifier using said global regularities;
   b) identifying a candidate subset of the web pages expected to have said local regularities; thereafter
   c) tentatively identifying and tagging, in said candidate subset of the web pages, elements having said global regularities, by using said global classifier to obtain first tentative labels;
   d) training a local classifier using said first tentative labels, said local classifier using said local regularities for its classification;
   e) tentatively identifying elements having specific combinations of said global regularities and said local regularities using said global classifier and said local classifier to obtain second tentative labels for said elements of said candidate subset; and thereafter
   f) outputting said second tentative labels as permanent labels associated with said elements of said candidate subset of web pages.

2. The method of claim 1 further including:
   g) deciding whether to retrain said local classifier with said second tentative labels.

3. The method according to claim 2, further including:
   h) training the local classifier using said second tentative labels.

4. The method according to claim 2, further including
   h) collecting said permanent labels associated with said elements of said candidate subset of web pages;
   i) training said global classifier in response to said permanent labels.

5. The method according to claim 1 wherein said second classifier treats selected global regularities differently than said global classifier treats said global regularities such that said local regularities contradict said global regularities.

6. The method according to claim 5 wherein said outputting step further includes ignoring training results of said global classifier.

7. The method according to claim 5 wherein said outputting step further includes combining training results of said global classifier and said local classifier.

8. In a data processing system, a method for learning and combining global regularities and local regularities for information extraction and classification, said global regularities being patterns which may be found over an entire dataset and said local regularities being patterns found in less than the entire dataset, said method comprising the steps of
   a) identifying a candidate subset of the dataset in which said local regularities may be found; thereafter
   b) tentatively identifying elements having said global regularities in a candidate subset to obtain first tentative labels, said first tentative labels being useful for tagging information having identifiable similarities; thereafter
   c) attaching said first tentative labels onto said identified elements of said candidate subset; thereafter
   d) employing said attached first tentative labels via one of a class of inductive operations to formulate first local regularities; thereafter
   e) tentatively identifying elements having specific combinations of said global regularities and said first local regularities to obtain attached second tentative labels; thereafter
   f) rating confidence of said attached second tentative labels and converting selected ones of said attached second tentative labels to confidence labels upon achieving a preselected confidence level; and then
   outputting data with said confidence labels; otherwise
   g) employing said second tentative labels via said operation on said candidate subset to formulate second local regularities, and
   h) repeating from step e) until said confidence labels have been fully developed.

9. The method according to claim 8 wherein said initial global regularity providing step comprises manually inputting descriptions of said global regularities.

10. The method according to claim 8 wherein said initial global regularity providing step comprises obtaining said global regularities from a further one of said class of said inductive operations that has been applied to a subset of said dataset, said subset of said dataset having been manually labeled.

11. The method according to claim 10 further including developing refined global regularities comprising the steps of:
   i) collecting confidence labels from at least one of said candidate subsets to obtain global confidence labels;
   j) employing said global confidence labels on candidate subsets along with said manually labeled dataset via one of said class of inductive operations to formulate said refined global regularities;
   k) providing descriptions of said refined global regularities to said working database; thereafter
   l) identifying a next candidate subset of the dataset in which local regularities may be found; thereafter
   m) tentatively identifying elements having said refined global regularities in said candidate subset to obtain next tentative labels; thereafter
   n) attaching said next tentative labels onto said identified elements of said next candidate subset; thereafter
   o) employing said attached next tentative labels via one of the class of inductive operations to formulate next local regularities; thereafter
   p) tentatively identifying elements having specific combinations of said refined global regularities and said next local regularities to obtain attached next second tentative labels; thereafter q) rating confidence of said attached next second tentative labels and converting selected ones of said attached next second tentative labels to confidence labels upon achieving a preselected confidence level; and then r) outputting data with said confidence labels; otherwise s) employing said next second tentative labels via said operation on said candidate subset to formulate next second local regularities, and t) repeating from step o).

12. The method according to claim 11 further including the steps of:

applying said data with confidence labels to further subsets of said dataset to investigate further subsets for local regularities.

13. The method according to claim 8 further including developing refined global regularities comprising the steps of:

i) collecting confidence labels from at least one of said candidate subsets to obtain global confidence labels;

j) employing said global confidence labels on candidate subsets via one of said class of inductive operations to formulate said refined global regularities;

k) providing descriptions of said refined global regularities to said working database; thereafter l) identifying a next candidate subset of the dataset in which local regularities may be found; thereafter m) tentatively identifying elements having said refined global regularities in said candidate subset to obtain next tentative labels; thereafter n) attaching said next tentative labels onto said identified elements of said next candidate subset; thereafter o) employing said attached next tentative labels via one of the class of inductive operations to formulate next local regularities; thereafter p) tentatively identifying elements having specific combinations of said refined global regularities and said next local regularities to obtain attached next second tentative labels; thereafter q) rating confidence of said attached next second tentative labels and converting selected ones of said attached next second tentative labels to confidence labels upon achieving a preselected confidence level; and then r) outputting data with said confidence labels; otherwise s) employing said next second tentative labels via said operation on said candidate subset to formulate next second local regularities; and t) repeating from step o).

14. The method according to claim 13 further including the steps of:

applying said data with confidence levels to further subsets of said dataset to investigate further subsets for local regularities.

15. In a data processing system, a method for learning and combining regularities of a first level and regularities of at least a second level and a third level for information extraction and classification, said first, second and third levels having a hierarchy from most global to most specific, said method comprising the steps of:

a) beginning at the most global level, training a classifier at the selected level by initially providing descriptions of regularities at said selected level to a working database, said selected level regularities being patterns which are to be found over a selected portion of a selected dataset corresponding to the selected level; thereafter b) identifying a candidate subset of each selected dataset in which next more specific regularities may be found; thereafter c) tentatively identifying elements having said selected regularities in said candidate subset to obtain first tentative labels, said first tentative labels being useful for tagging mutually similar information; thereafter d) attaching said first tentative labels onto said identified elements of said candidate subset; thereafter e) employing said attached first tentative labels via one of a class of inductive operations to formulate first local regularities; thereafter f) tentatively identifying elements having specific combinations of said global regularities and said local regularities to obtain attached second tentative labels; thereafter g) rating confidence of said attached second tentative labels and converting selected ones of said attached second tentative labels to confidence labels upon achieving a preselected confidence level; and then h) outputting data with said confidence labels; otherwise i) employing said second tentative labels via said operation on said candidate subset to formulate second more specific regularities;

k) repeating from step f); and l) repeating from step a) for each successive more selective level of regularity.

* * * * *

UNITED STATES PATENT AND TRADEMARK OFFICE
CERTIFICATE OF CORRECTION

PATENT NO. : 6,892,189 B2  Page 1 of 1
DATED : May 10, 2005
INVENTOR(S) : Dallan W. Quass et al.

It is certified that error appears in the above-identified patent and that said Letters Patent is hereby corrected as shown below:

Column 7,
Line 65, delete "a".

Column 11,
Line 50, delete "o" and replace with -- p --.

Signed and Sealed this

Eleventh Day of April, 2006

JON W. DUDAS
*Director of the United States Patent and Trademark Office*